April 13, 1943.   H. C. FRENCH   2,316,412
BOTTOM DUMP TRAILER WAGON
Filed Feb. 23, 1942   2 Sheets-Sheet 2

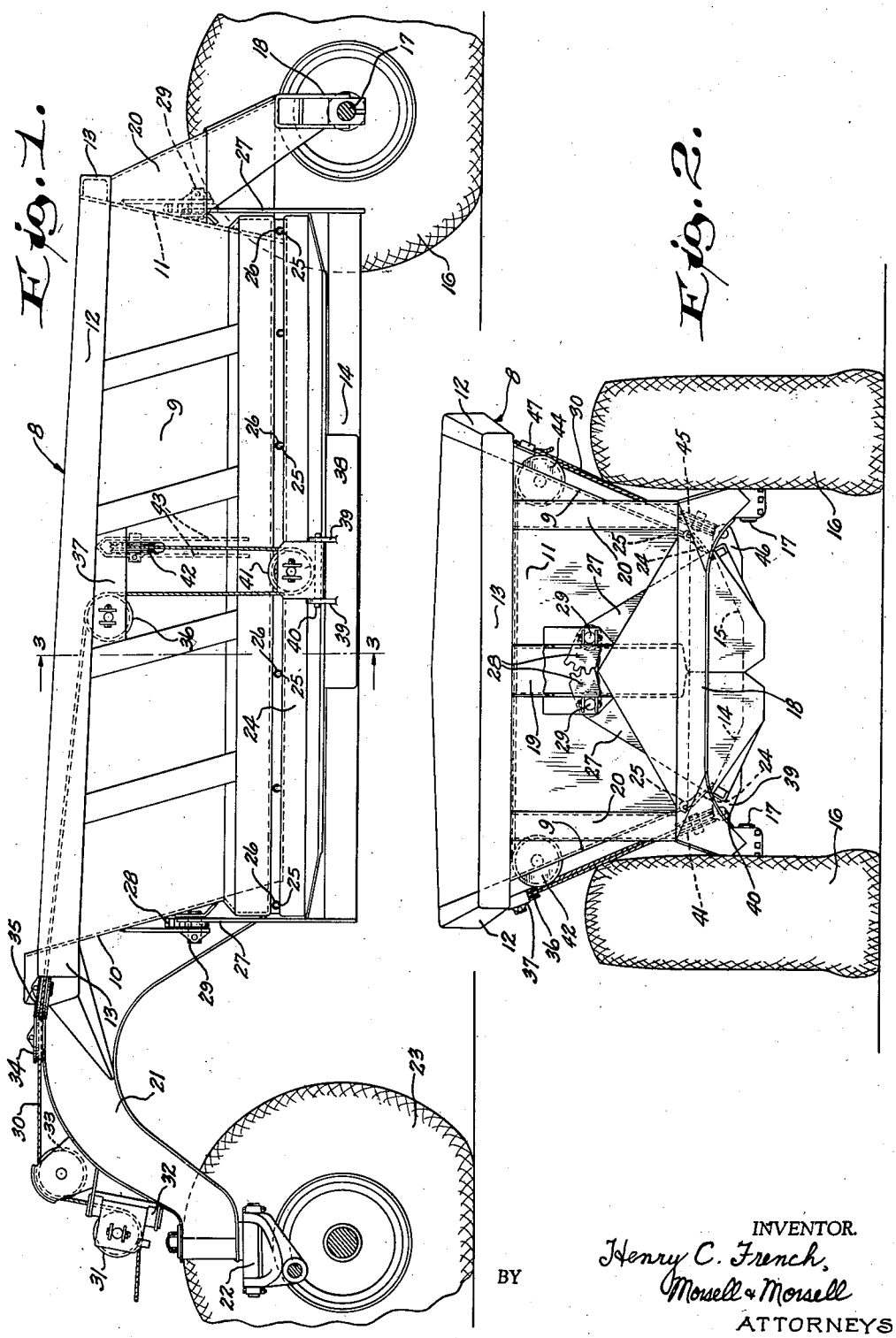

INVENTOR.
Henry C. French,
BY Morsell & Morsell
ATTORNEYS

Patented Apr. 13, 1943

2,316,412

UNITED STATES PATENT OFFICE 2,316,412

BOTTOM DUMP TRAILER WAGON

Henry C. French, Elm Grove, Wis., assignor to The Heil Co., Milwaukee, Wis., a corporation of Wisconsin Application February 23, 1942, Serial No. 432,057

12 Claims. (Cl. 298—35)

This invention relates to improvements in bottom dump trailer wagons.

There are available trailer and semi-trailer wagons equipped with bottom dump gates but in such structures mechanism such as taut cables, latches, etc. is required to maintain the gates in closed condition and to retain the load within the wagon body.

It is, therefore, a primary object of the present invention to provide a bottom dump trailer wagon in which the bottom dump gates are automatically held in closed position and in which power or positive means are only employed to move the gates to open or dumping position, the return of the gates from the latter position to closed position being accomplished by gravity.

A more specific object of the invention is to provide a bottom dump wagon having movable bottom gates which are operated by means of a single cable attached thereto.

A further object of the invention is to provide a single cable operated bottom gate structure for a dump wagon wherein the ends of the complementary gates carry companion plates with meshing gear portions, whereby the bottom gates are compelled to move and operate simultaneously, uniformly and evenly, overcoming any tendency the same might have toward non-uniform and progressive movements such as might ordinarily be imposed thereon through the use of a single cable attached to one gate in advance of the other.

A further object of the invention is to provide a bottom dump wagon wherein scrapers automatically cooperate with the bottom gates, during movements of the latter, to keep the same clean.

A further object of the invention is to provide a bottom dump wagon wherein the bottom gates, and the companion end plates carried thereby, move upwardly above the bottom contour of the vehicle body when the gates are opened for load dumping purposes, with the result that the gates and dumping mechanism are entirely above the vehicle axles affording a high rear unloading clearance and eliminating the necessity of driving the vehicle off of a windrow during unloading, and additionally providing a high front body clearance for ease in effecting short right and left turns.

A further object of the invention is to provide a bottom dump trailer wagon which is simple in construction and operation, which is strong and durable, and which is well adapted for the purposes set forth.

With the above and other objects in view the invention consists of the improved bottom dump wagon and its parts and combinations as set forth in the claims, and all equivalents thereof.

In the accompanying drawings in which the same reference characters indicate the same parts in all of the views:

Fig. 1 is a side view of the improved bottom dump trailer wagon, with the tractor axle in section and with the forward wagon wheel removed;

Fig. 2 is a rear end view of the dump wagon;

Figure 4:
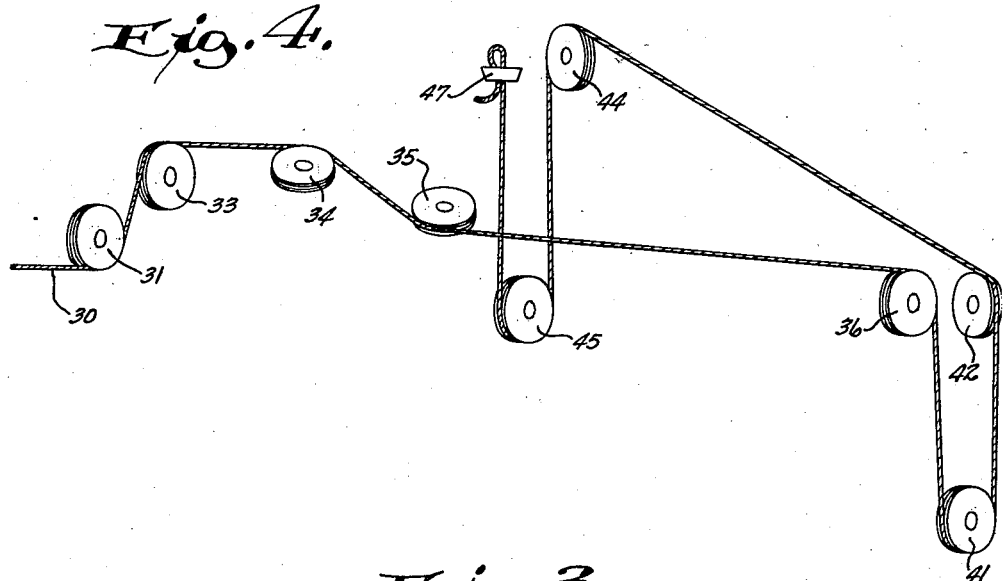
Fig. 4 is a schematic, perspective view of the sheave and cable arrangement by which the bottom gates of the wagon are operated and controlled.

Referring now more particularly to the drawings it will appear that by way of illustration the invention has been shown as being incorporated in a dump wagon of the semi-trailer type, although it should be understood that the features of the invention are more generally applicable and may be incorporated in dumping vehicles of various kinds, whether the same be trailers or self propelled.

In the illustrated embodiment of the invention the wagon body is designated generally by the numeral 8 and is of hopper-like formation including spaced, downwardly inwardly inclined side walls 9 and downwardly inwardly inclined front and rear walls 10 and 11. The upper end of the body is open and the upper portions of the walls carry, for strengthening and reenforcing purposes, longitudinal channels 12 and end channels 13. The bottom of the hopper-like body 8, which is adapted to be opened for load dumping purposes, is normally closed and controlled by a pair of complementary, longitudinally extending gates 14 and 15, which, in closed condition, meet along the longitudinal center line of the body bottom. Said gates will be described more in detail hereinafter.

The rear end of the trailer wagon is transportably supported by spaced rear wheels 16 mounted on stub axles 17. The axles are journalled in the bearing portions of a rear carriage 18 which includes a central strut 19 and side struts 20, all of which extend forwardly upwardly and are rigidly secured to the rear wall 11 of the body.

Extending forwardly from the front wall 10 of the body, intermediate the sides thereof, is a gooseneck 21. The forward extremity of said goose-neck carries a conventional universal yoke trailer hitch 22 secured to a rear frame portion of a tractor (not shown) between the rear traction wheels 23 thereof. Hence, the rear end of the trailer wagon is supported for transportation on its wheels 16, while the forward end of the wagon is turnably attached to the rear end of a tractor or other vehicle which provides the motive power.

Figure 3:
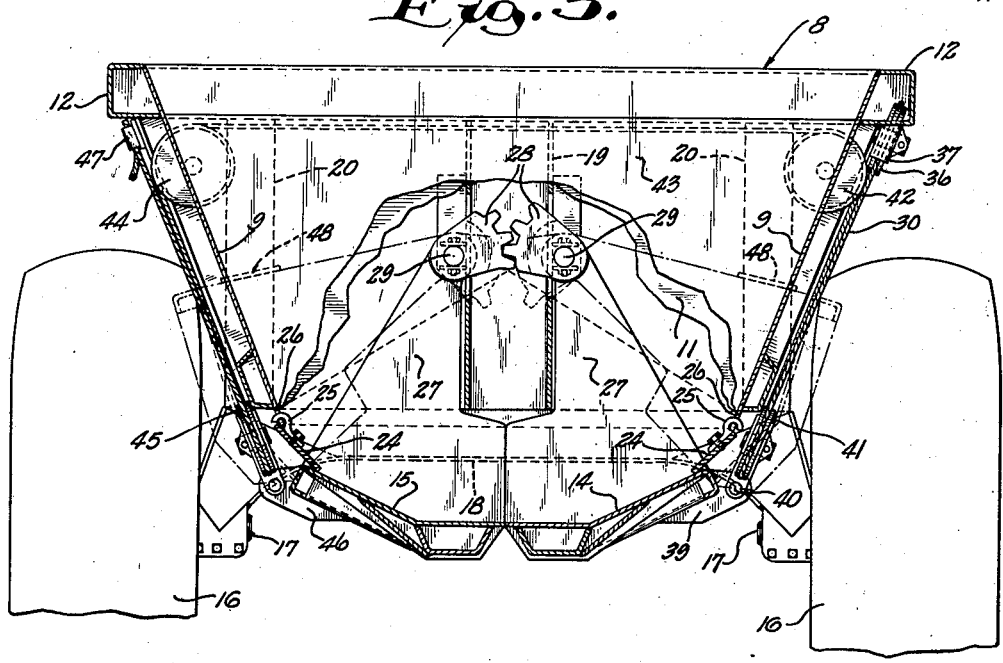
Fig. 3 is a transverse, vertical sectional view taken on line 3—3 of Fig. 1 and on a larger scale, and with additional parts broken away and in section.

As before mentioned, the open bottom of the body 8, in the form of a rectangle, is controlled by a pair of complementary, elongated gates 14 and 15 extending the length of said bottom opening and each gate controlling one-half the width of said opening. As best shown in Fig. 3 each gate is of slightly angled formation and in closed condition the longitudinal inner edges of the companion gates abut one another. In closed condition each gate also has its outer side edge portion, which is angled upwardly, outwardly, overlapped by the free edge portion of an elongated scraper plate 24. As shown in Figs. 1 and 3 a scraper plate 24 carries a plurality of spaced hooks 25 whose offset and rounded end portions extend through apertures 26 in the lower side wall portion of the body 8.

Each end of each bottom gate member 14 and 15 has welded or otherwise secured thereto the lower portion of a vertical end plate 27 of irregular contour and reduced at its upper end portion. The two plates 27 at the rear of the body are coacting, as are the two plates 27 at the front of the body. As shown in Figs. 2 and 3 the upper end portion of each plate of a coacting pair is formed with an integral gear segment 28 with the gear segments of a pair of end plates being in mesh. The reduced upper end portion of each plate 27 is pivotally mounted on and exteriorly of an end 10 or 11 of the wagon body, as at 29.

Both of the bottom gate members 14 and 15 are jointly controlled and operated by a single cable 30. This cable extends from and is adapted to be wound on the drum of a winch or power control unit (not shown) which is carried by the tractor and operatively connected with the power take-off shaft of the latter. As shown in Fig. 1 and schematically in Fig. 4, the forward end portion of the wagon goose-neck 21 carries a vertically disposed sheave 31 which is pivotal laterally on a substantially vertical pivot 32. Revolubly mounted on the goose-neck 21 rearwardly of the sheave 31 is a vertically disposed guide sheave 33. The cable 30 extends about lower and rear portions of the sheave 31 and over the upper portion of the guide sheave 33. From the latter sheave the cable extends to and about a horizontal sheave 34 mounted at the front intermediate portion of the body 8 and from thence to another horizontally disposed sheave 35 mounted at one upper side corner portion of the body. On the same side portion of the body, intermediate the front and rear ends, is a vertically disposed sheave 36 mounted between an upper exterior side wall portion of the body and a plate 37 and arranged so that the upper peripheral portion of said sheave projects through a bottom slot and into the body side channel 12. The cable 30 is, of course, brought about the sheave 36, and the extent of said cable between the sheaves 35 and 36 is disposed within the channel, passing through an opening at the forward end thereof.

An exterior portion of the bottom gate 14, intermediate its ends, carries a plate 38 from which project trunnions 39 in which the ends of a horizontal pivot pin 40 for the casing of a lower vertically disposed sheave 41 are journalled. The cable 30 extends from the upper sheave 36 downwardly, about the sheave 41 and then upwardly and over another upper sheave 42 which is vertically disposed, but in a plane at right angles to the plane of the sheave 36. The sheave 42 serves to guide the cable transversely across the upper interior portion of the body 8 and is arranged so as to extend through a slot in the wall 9. Said sheave 42 is furthermore revolubly mounted on a pin secured between the spaced walls 43 forming an interior transverse partition for the body 8. Within the opposite side of the partition 43 there is revolubly mounted another upper guide sheave 44 over which is extended that stretch of the cable 30 which traverses the upper inner body portion of the wagon. From the sheave 44, which likewise projects through a slot in the upper side wall 9 of the body, the cable extends exteriorly of the body and down said side wall, being brought about the lower portion of a sheave 45. The latter sheave is transversely alined with the previously mentioned sheave 41 and its enclosing casing is pivotally mounted on trunnions 46 mounted on the lower portion of the bottom gate 15, intermediate the ends of said bottom gate. From the sheave 45 the cable 30 is then extended upwardly and is made fast to a bracket or clamp 47 on the upper outer side wall portion of the same side of the wagon body.

From the foregoing description of the cable and sheave arrangement it will be apparent that but a single cable is employed for the joint operation of both of the wagon body bottom gates 14 and 15. When the tractor borne and operated winch (not shown) has its drum revolved in a direction so as to wind the cable 30, said cable, during the process of being wound on the drum and thus shortened, of course moves on the various rotatably mounted sheaves, some of which are free to swivel for proper alining. The pull imposed on the cable is first imparted to the bottom gate 14 and through the various extents of the cable is then imparted to the bottom gate 15, it being noted that the sheaves 41, 45 are pivotally connected directly to the bottom gates 14 and 15 respectively. Under ordinary conditions the pull exerted by the cable being wound would first be imparted to the gate 14 and subsequently to the gate 15, with the result that said gates might not operate simultaneously, but the movement of the gate 15 would follow the movement of the gate 14, with a slight time lag. To counteract this, the complementary end plates 27 come into play. By virtue of the fact that each pair of plates 27 at each end of the structure are geared together through the gear segments 28, when one gate begins to move, as the gate 14, it will swing on the support 29 as a pivot, turning the gear segment 28 and its plate. This movement of the gear segment will immediately correspondingly turn the gear segment on the companion plate 27 and cause a swinging movement of the gate 15 so that in effect said gate will move simultaneously and uniformly with the gate 14. The movement of the gates is obviously equalized and at the same rate of speed.

In moving from the closed position depicted in full lines in Fig. 3 to an open dumping position depicted in broken lines in Fig. 3, the gates 14 and 15, including their rigidly attached end plates or wings 27, swing in an arc on the pivot supports 29 and the arcs of movement are such that the gates traverse the lower exterior side wall portions of the wagon body. Stops 48 limit the upward swinging and opening movement of the lower gates.

Another important feature to be observed is in respect to the pivotally mounted longitudinally extended scrapers 24. These members are so arranged that their free edge portions scrape the top surfaces of the gates 14 and 15 as said gates move to and from open position, thereby freeing said surfaces of the gates from dirt and foreign material which might tend to adhere thereto. While the scrapers 24 are pivotal they are nevertheless arranged in a position so as to be gravity weighted and are thus constantly urged into scraping engagement with the top surface portions of the gates 14 and 15. When the gates are in closed position said scrapers close and bridge the spaces between the outer edge portions of the gates and the lower edge portions of the side walls 9 of the body.

As before noted, when the tractor winch or power control unit is operated so as to cause its drum to wind a cable, the body bottom gates 14 and 15 are moved to open dumping position. After they have reached the desired open position they will be so held as long as the cable 30 is maintained in a taut condition. Closing of the gates 14 and 15 is accomplished in an extremely simple manner and solely by gravity. It is merely necessary to operate the winch so that the drum is in a free rolling condition, whereupon gravity and the weight of the gates 14 and 15 will cause the same to swing downwardly to closed position, automatically. The gate structure is such that the bottom gates are automatically maintained in closed, load retaining condition solely by gravity and to maintain the gates in this condition it is not necessary to employ a taut cable, power means or latches. The power operated means is utilized solely for the purpose of moving the gates to open dumping position.

It should furthermore be noted that when the gates are in closed position they are in their lowermost position. When the gates are opened they are above the wagon axle with the result that the wagon has a high rear unloading clearance and also a high clearance at the front of the wagon, permitting short right and left hand turns. With the gates open for unloading, there is nothing in the body structure projecting below the axle of the wagon so that the vehicle, when it is being unloaded, does not interfere with, nor does it have to be driven off of, windrows.

From the foregoing description it will be apparent that the improved bottom dump trailer wagon is of simple and novel construction, is easily and efficiently operated, utilizes a minimum of power, and is well adapted for the purposes described.

What is claimed as the invention is:

1. A dumping wagon, comprising a transportable hollow body formed of connected side and end walls and having a discharge opening in the bottom thereof, a cradle-like gate having a bottom portion and upstanding ends, said bottom portion normally closing the body discharge opening, means pivotally connecting the gate ends to the end walls of the body, an elongated flexible, pullable member, means effecting a running connection between the pullable member and the gate, and means for anchoring one end of the pullable member whereby a pull on the other end of said member causes said gate to swing in an arc upwardly and away from said body discharge opening.

2. A dumping wagon, comprising a transportable hollow body formed of connected side and end walls and having a longitudinally extending discharge opening in the bottom thereof, a cradle-like gate having a bottom portion and upstanding end plates, said bottom portion normally coinciding with and closing the body discharge opening, means pivotally connecting the gate end plates to elevated exterior portions of the end walls of the body, an elongated, flexible, pullable member connected to said gate for swinging it in an arc upwardly and along outer wall portions of the body, and a weighted scraper blade pivotally depended from a portion of the body and contactable with the bottom portion of the gate during movements of the gate, for cleaning purposes.

3. A dumping wagon, comprising a transportable hollow body formed of connected side and end walls and having a longitudinally extending discharge opening in the bottom thereof, a cradle-like gate having a bottom portion and upstanding end plates, said bottom portion normally coinciding with and closing the body discharge opening, means pivotally connecting the gate end plates to elevated exterior portions of the end walls of the body, an elongated, flexible, pullable member connected to said gate for swinging it in an arc upwardly and along outer wall portions of the body, and a weighted scraper blade pivotally depended from a side of the body and extending longitudinally of said opening with its free edge constantly urged by gravity into contact with the bottom portion of the gate to clean the same during swinging movements of the gate.

4. A dumping wagon, comprising a transportable hollow body having a discharge opening in the bottom thereof, a pair of complementary gates for normally closing said opening, and a single, elongated cable having a running connection with both of said gates in series and arranged so that a pull on said cable will separate said gates and elevate the same along opposite side walls of the body to expose said body discharge opening, a portion of said cable being anchored to the body.

5. A dumping wagon, comprising a transportable hollow body formed of connected side and end walls and having a longitudinally extending discharge opening in the bottom thereof, a pair of complementary gates for normally closing said opening, a single, elongated, flexible, pullable member extending to and connected with both of said gates for separating the same and elevating them along opposite side walls of the body to expose said body discharge opening, and a pair of weighted scraper blades pivotally depended from opposite lower side wall portions of the body and contactable with the gates to clean the same during movements of the gates.

6. A dumping wagon, comprising a transportable hollow body formed of connected side and end walls and having a longitudinally extending discharge opening in the bottom thereof, a pair of complementary gates normally positioned with their inner edges in abutment along the longitudinal median of said body discharge opening to close the same, means movably mounting said gates on the body, and a single, elongated cable having a running connection with both of said gates in series, an end portion of the cable being anchored so that a pull on said cable will separate said gates laterally and elevate the same along opposite exterior side wall portions of the body to expose said body discharge opening.

7. A dumping wagon, comprising a transportable hollow body formed of connected side and end walls and having a longitudinally extending discharge opening in the bottom thereof, a pair of complementary gates normally positioned with their inner edges in abutment along the longitudinal median of said body discharge opening to close the same, means movably mounting said gates on the body, and an elongated cable having one end portion pullably supported adjacent the wagon and having its other end portion anchored to another portion of the wagon, intermediate portions of the cable being shiftably attached to both of said gates, whereby a pull on said cable will separate said gates laterally and elevate the same along side wall portions of the body to expose said body discharge opening.

8. A dumping wagon, comprising a transportable hollow body having a discharge opening in the bottom thereof, a pair of complementary gates for normally closing said opening, elongated, flexible pullable means extending to and having a running connection with both of said gates in series for elevating the same away from said body discharge opening, and additional means connecting said gates to cause the same to move simultaneously and uniformly.

9. A dumping wagon, comprising a transportable hollow body formed of connected side and end walls and having a longitudinally extending discharge opening in the bottom thereof, a pair of complementary gates for normally closing said opening, means swingably mounting said gates on the body, an elongated, flexible, pullable member extending to and connected with both of said gates to swing the same away from each other and upwardly along opposite side wall portions of the body to expose said body discharge opening, and a pair of meshing gears, each being integral with a gate, to harmonize movement of the gates.

10. A dumping wagon, comprising a transportable hollow body formed of connected side and end walls and having a longitudinally extending discharge opening in the bottom thereof, a pair of complementary cradle-like gates each having a bottom portion and upstanding end plates, said gates being normally positioned with the inner edges of their bottom portions in abutment along the longitudinal median of said body discharge opening to close the same, means pivotally connecting the gate end plates to elevated exterior portions of the end walls of the body, an elongated, flexible, pullable member extending to and connected with both of said gates to swing the same away from each other and upwardly along opposite side wall portions of the body to expose said body discharge opening, and gear segments integral with upper portions of the end plates of the gates, the gear segments on each adjacent pair of plates being constantly in mesh to harmonize movement of the gates.

11. In combination, a wheel supported bulk material holding wagon body formed of connected side and end walls and having a longitudinally extending discharge opening in the bottom thereof, a pair of complementary cradle-like gates each having a bottom portion and upstanding end plates, said gates being normally positioned with the inner edges of their bottom portions in abutment along the longitudinal median of said body discharge opening to close the same, means pivotally connecting the gate end plates to elevated exterior portions of the end walls of the body, a single elongated cable having one end portion movably supported on a portion of the wagon and having its other end portion anchored to another part of the wagon, intermediate portions of the cable being shiftably attached to both of said gates in series, gear segments integral with upper portions of the end plates of the gates, the gear segments on each adjacent pair of plates being constantly in mesh to harmonize movements of the gates, and a pair of weighted scraper blades pivotally depended from opposite lower side wall portions of the body and contactable with the bottom portions of the gates to clean the same during movements of the gates.

12. A dumping wagon, comprising a transportable hollow body having a discharge opening in the bottom thereof, a pair of complementary gates for normally closing said opening, means swingably mounting said gates on the body, an elongated, flexible pullable member extending to and connected with both of said gates to swing the same away from each other and upwardly along opposite side wall portions of the body to expose said body discharge opening, and interconnecting elements between said gates to cause substantial harmonizing movement of the same.

HENRY C. FRENCH.